US012578765B2

(12) United States Patent
Yan et al.

(10) Patent No.: US 12,578,765 B2
(45) Date of Patent: Mar. 17, 2026

(54) DISPLAY MODULE AND DISPLAY DEVICE

(71) Applicant: KunShan Go-Visionox Opto-Electronics Co., Ltd, Jiangsu (CN)

(72) Inventors: Desong Yan, Jiangsu (CN); Fu Liao, Jinagsu (CN); Liwei Ding, Jiangsu (CN); Yongfeng Zhao, Jiangsu (CN); Hongqi Hou, Jiangsu (CN); Zheng Li, Jiangsu (CN)

(73) Assignee: KunShan Go-Visionex Opto-Electronics Co., Ltd, Kunshan (CN)

( * ) Notice: Subject to any disclaimer, the term of this patent is extended or adjusted under 35 U.S.C. 154(b) by 161 days.

(21) Appl. No.: 18/297,284

(22) Filed: Apr. 7, 2023

(65) Prior Publication Data

US 2023/0244278 A1 Aug. 3, 2023
US 2024/0419217 A2 Dec. 19, 2024

Related U.S. Application Data

(63) Continuation of application No. PCT/CN2021/126918, filed on Oct. 28, 2021.

(30) Foreign Application Priority Data

Jan. 29, 2021 (CN) .......................... 202110130722.9

(51) Int. Cl.
*G06F 1/16* (2006.01)

(52) U.S. Cl.
CPC .......... *G06F 1/1656* (2013.01); *G06F 1/1616* (2013.01); *G06F 1/1624* (2013.01)

(58) Field of Classification Search
CPC .... G06F 1/1616; G06F 1/1624; G06F 1/1652; G06F 1/1656; G09F 9/301; H04M 1/0268
See application file for complete search history.

(56) References Cited

U.S. PATENT DOCUMENTS 11,910,549 B2 * 2/2024 Ko .......................... G06F 1/1624
2013/0058063 A1 3/2013 O'Brien
(Continued)

FOREIGN PATENT DOCUMENTS

CN 2718972 Y 8/2005
CN 106097896 A 11/2016
(Continued)

OTHER PUBLICATIONS

Office Action issued on Jan. 16, 2024, in corresponding Japanese Application No. 2023-530014, 23 pages.
(Continued)

*Primary Examiner* — Imani N Hayman
(74) *Attorney, Agent, or Firm* — Maier & Maier, PLLC

(57) ABSTRACT

A display module includes: a display panel including a display surface and a non-display surface arranged opposite to each other; a support layer arranged on the non-display surface of the display panel, the support layer having a first surface away from the display panel, and at least part of the first surface is provided with a first shape portion arranged in a predetermined direction; and a rotating shaft having a second shape portion in a circumferential direction, the support layer and the display panel arranged around an outer circumference of the rotating shaft, the first shape portion of the first surface engaged with the second shape portion of the rotating shaft.

19 Claims, 7 Drawing Sheets

(56) References Cited

U.S. PATENT DOCUMENTS

| | | | |
|---|---|---|---|
| 2018/0103552 A1 | 4/2018 | Seo et al. | |
| 2019/0025691 A1* | 1/2019 | Abe | G03B 21/60 |
| 2020/0050177 A1* | 2/2020 | Tong | H05K 5/0243 |
| 2020/0314225 A1 | 10/2020 | Ahn | |
| 2020/0363841 A1 | 11/2020 | Kim et al. | |

FOREIGN PATENT DOCUMENTS

| | | | |
|---|---|---|---|
| CN | 106448465 A | * 2/2017 | |
| CN | 206100100 U | 4/2017 | |
| CN | 207817576 U | 9/2018 | |
| CN | 108932908 A | 12/2018 | |
| CN | 209543792 U | 10/2019 | |
| CN | 110493396 A | 11/2019 | |
| CN | 209708516 U | 11/2019 | |
| CN | 210015397 U | 2/2020 | |
| CN | 110910767 A | 3/2020 | |
| CN | 111667760 A | 9/2020 | |
| CN | 111669455 A | 9/2020 | |
| CN | 111768709 A | 10/2020 | |
| CN | 111816064 A | 10/2020 | |
| CN | 111833743 A | * 10/2020 | F16H 37/12 |
| CN | 111862822 A | * 10/2020 | G09F 9/301 |
| CN | 111862825 A | 10/2020 | |
| CN | 111899644 A | 11/2020 | |
| JP | 2003198689 A | 7/2003 | |
| KR | 1020190062855 A | 6/2019 | |
| KR | 102204456 B1 | 1/2021 | |
| TW | 1684273 B | 2/2020 | |
| WO | 2020211948 A1 | 10/2020 | |

OTHER PUBLICATIONS

Extended Search Report issued on Mar. 15, 2024, in corresponding European Application No. 21922412.8, 11 pages.

International Search Report mailed Jan. 26, 2022, in International Application No. PCT/CN2021/126918, 5 pages.

First Office Action issued on Mar. 3, 2022, in corresponding Chinese Application No. 202110130722.9, 19 pages.

First Office Action issued on Aug. 24, 2022, in corresponding Chinese Application No. 202110130722.9, 19 pages.

Office Action issued on Jul. 8, 2025, in corresponding Korean Application No. 10-2023-7015998, 18 pages.

* cited by examiner

DISPLAY MODULE AND DISPLAY DEVICE

CROSS REFERENCE TO RELATED APPLICATION

The present application is a continuation of International Application No. PCT/CN2021/126918, filed on Oct. 28, 2021, which claims priority to Chinese Patent Application No. 202110130722.9, filed on Jan. 29, 2021, titled "DISPLAY MODULE AND DISPLAY DEVICE", both of which are hereby incorporated by reference in their entireties.

TECHNICAL FIELD

The present disclosure relates to the technical field of electronic products, and in particular to a display module and a display device.

BACKGROUND

At present, with the development of display technology, electronic devices on the market and exhibition have folding forms which basically includes two-folding form (inward-folding form, outward-folding form), three-folding form (two-inward-folding form, two-outward-folding form, inward-and-outward-folding form) and other forms. In the form of a folding screen, a screen size can be switched according to the needs. In a using state, a large screen can be obtained by unfolding a bending portion for easy watching, and in a non-using state, the large screen can be folded to facilitate portability. However, this kind of folding screen is prone to a crease at a folding position, so that it may affect the display effect of the display screen.

Therefore, there is an urgent need for a new module solution that can change the screen size.

SUMMARY

The embodiments of the present application provide a display module and a display device, which can change a visible area of the display panel by sliding and moving.

In a first aspect, the embodiments of the present application provide a display module including: a display panel including a display surface and a non-display surface arranged opposite to each other: a support layer arranged on the non-display surface of the display panel, the support layer having a first surface away from the display panel, and at least part of the first surface is provided with at least one first shape portion arranged in a predetermined direction; and a rotating shaft, an outer circumference of the rotating shaft provided with at least one second shape portion, the support layer and the display panel arranged around an outer circumference of the rotating shaft, the first shape portion of the first surface engaged with the second shape portion of the rotating shaft. The display panel includes a part in a first state and a part in a second state, and the rotating shaft is enabled to rotate to drive the first shape portion and the second shape portion engaged with each other to move relative to each other to drive the support layer to rotate, such that a part of the display panel can be switched between the first state and the second state.

In another aspect, the embodiments of the present application provide a display device. The display device includes the display module as described above.

The present application provides the display module and the display device. The display module includes the display panel, the support layer, and the rotating shaft. The rotating shaft has the second shape portion in a circumferential direction. The display panel includes the display surface and the non-display surface arranged opposite to each other. The support layer is arranged on the non-display surface of the display panel. The support layer has the first surface away from the display panel. At least part of the first surface is provided with the shape portion arranged in the predetermined direction. The support layer and the display panel are arranged around the outer circumference of the rotating shaft. The first shape portion of the first surface engaged with the second shape portion of the rotating shaft. The display panel includes the part in the first state and the part in the second state. According to the first shape portion and the second shape portion engaged with each other, when the rotating shaft rotates, the rotating shaft can drive the first shape portion and the second shape portion engaged with each other to move relative to each other to drive the support layer to rotate, such that a part of the display panel can be switched between the first state and the second state. During the process of controlling the part in the first state in the display panel, since the support layer is arranged, it can provide a support force to the display panel arranged around the rotating shaft, so as to avoid the display panel from being easily wrinkled and deformed during repeated use. In addition, the display panel is facilitated to slide by providing the first shape portion and the second shape portion engaged with each other on the support layer: at the same time, an engaging position is on the support layer, so that it can prevent the force generated by the rotating shaft from directly acting on the bending portion of the display panel during the movement; therefore, the stress concentration of the display panel at the position can be reduced, the display panel can be prevented from being damaged, and the performance of the display module can be improved.

DETAILED DESCRIPTION

It should be noted that, in this text, the relational terms, such as first, second and the like, are only used to distinguish one entity or operation from another entity or operation, and do not necessarily require or imply that there is a relationship or order between these entities or operations. In addition, the term "comprise," "include," or any other variation thereof are intended to cover a non-exclusive inclusion, so that the process, method, article, or apparatus including a set of elements includes not only those elements, but also other elements not explicitly listed, or includes elements inherent to such a process, method, article, or apparatus. Without further limitations, an element defined by the expression "comprising . . . " does not exclude the presence of additional identical elements in the process, method, article, or device that includes the element.

In order to better understand the present application, a display module and a display device in the embodiments of the present application will be described in detail below with reference to FIGS. 1 to 11.

Figure 1:
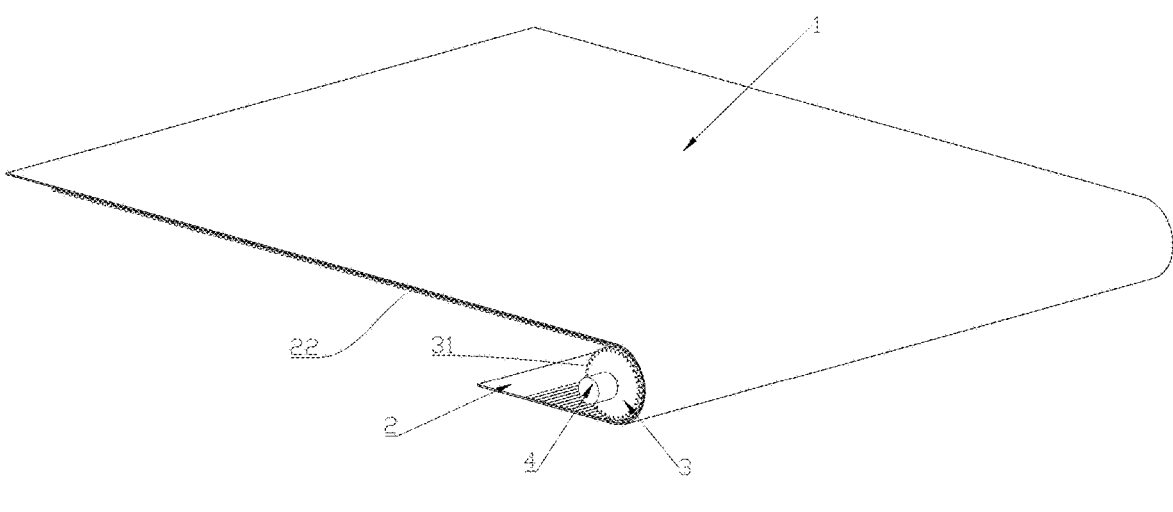
FIG. 1 shows a structural schematic view of a display module provided by an embodiment of the present application.
Figure 2:
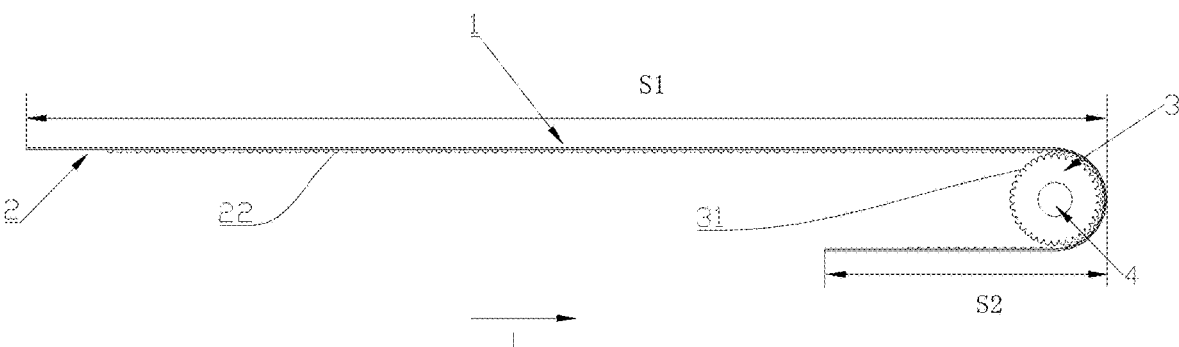
FIG. 2 shows a front view of a display module provided by an embodiment of the present application.
Figure 3:
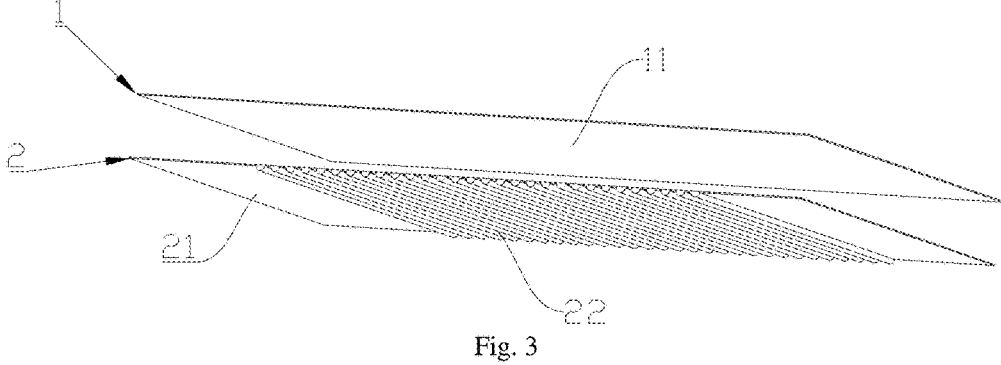
FIG. 3 shows an exploded view of a display panel and a support layer in an unfolding state provided by an embodiment of the present application.

Referring to FIG. 1 to FIG. 3 together, the embodiments of the present application provide a display module. The display module includes a display panel 1. The display panel 1 may be a flexible panel capable of bending and deforming, so that a size of an exposed screen area of the display panel 1 can be adjusted by operations, such as bending, sliding and the like. The display panel 1 includes a display surface and a non-display surface 11 arranged opposite to each other. The display module includes a support layer 2. The support layer 2 is attached on the non-display surface 11 of the display panel 1 to support the display panel 1. The support layer 2 has a first surface 21 away from the display panel 1, and at least part of the first surface 21 is provided with at least one first shape portion 22 arranged in a predetermined direction. The display module further includes a rotating shaft 3. An outer circumference of the rotating shaft 3 is provided with at least one second shape portion 31. The support layer 2 and the display panel 1 are arranged around the outer circumference of the rotating shaft 3. The first shape portion 22 of the first surface 21 engaged with the second shape portion 31 of the rotating shaft 3. The display panel 1 includes a part in a first state S1 and a part in a second state S2. The rotating shaft 3 can rotate to drive the first shape portion 22 and the second shape portion 31 engaged with each other to move relative to each other to drive the support layer 2 to rotate, such that a part of the display panel 1 can be switched between the first state S1 and the second state S2. For example, the first state S1 can be set as a visible state that can be seen, and the second state S2 can be set as a folding state that cannot be seen. The rotating shaft 3 can rotate to drive the first shape portion 22 and the second shape portion 31 engaged with each other to move relative to each other, such that the rotating shaft 3 can drive an area of a part of the display panel in the visible state to increase and an area of a part of the display panel in the folding state to decrease, so as to increase a screen area of the display panel 1, or drive an area of a part of the display panel in the visible state to decrease and an area of a part of the display panel in the folding state to increase, so as to decrease a screen area of the display panel 1. Further, on a basis of setting the first state S1 as the visible state that can be seen, the part in the second state S2 in the display panel may also be provided with an additional visible part that can be at least partially visible, so as to increase the visual effect of the display panel 1 and meet different usage requirements, which is not specifically limited here.

In an embodiment, at least part of the first surface can be provided with a plurality of first shape portions arranged in the predetermined direction: the outer circumference of the rotating shaft can be provided with at least one second shape portion. For the first shape portion 22 and the second shape portion 31 respectively arranged on the first surface 21 and the rotating shaft 3 to be engaged with each other, the plurality of first shape portions 22 may be a plurality of racks arranged in a predetermined direction. A recess can be formed between two adjacent racks. A plurality of second shape portions 31 may be a plurality of gears arranged on an outer wall of the rotating shaft 3 in a circumferential direction. The plurality of gears and the rotating shaft 3 may be integrally formed to form a gear shaft. At least part of the gears can partially extend into a recessed position between the racks, so that the gears can mesh with the racks. The display panel 1 can be divided into the part in the first state S1 and the part in the second state S2 by the gear shaft. The gear shaft can drive the support layer 2 to rotate, so that a part of the display panel 1 can be switched between the first state S1 and the second state S2. The first shape portions 22 and the second shape portions 31 can also be arranged in the form of a protrusion and a recess engaged with each other to realize the rotating shaft 3 driving the support layer 2 to rotate, which is not specifically limited here.

The embodiments of the present application provide the display module. During the process of controlling the area of the part in the first state S1 in the display panel 1 to increase or decrease, since the support layer 2 can be arranged, it can provide a support force to the display panel arranged around the rotating shaft 3, so as to avoid the display panel 1 from being easily wrinkled and deformed during repeated use. In addition, the display panel 1 can be facilitated to slide by providing the first shape portion 22 and the second shape portion 31 engaged with each other on the support layer 2: at the same time, an engaging position of the first shape portion 22 and the second shape portion 31 is located between the support layer 2 and the rotating shaft 3, so that it can prevent the force generated by the rotating shaft 3 during rotating from directly acting on a portion of the display panel 1 correspondingly arranged around rotating shaft 3: therefore, the stress concentration of the display panel 1 at the position corresponding to the rotating shaft 3 can be reduced, the display panel 1 can be prevented from being damaged, the usage performance of the display panel 1 can be improved, and the display panel can be not easy to be damaged.

The support layer 2 and the display panel 1 are arranged around the rotating shaft 3 and engaged with each other. There may be one or more rotating shafts 3.

Referring to FIG. 1 and FIG. 2, when there is only one rotating shaft 3, a side of the support layer 2 in a first direction L can be arranged around the outer circumference of the rotating shaft 3, and a predetermined direction in which the plurality of first shape portions 22 are arranged on the first surface 21 is the first direction L. The support layer 2 and the display panel 1 arranged around the rotating shaft 3 are divided into the part in the first state S1 and the part in the second state S2 by the rotating shaft 3. The part in the second state S2 can be located directly below the part in the first state S1. The rotating shaft 3 can rotate forward or reversely in its own axis, so that different second shape portions 31 on the rotating shaft 3 can engage with different first shape portions 22. Therefore, during the rotating shaft 3 rotating, the area of the part in the first state S1 in the display panel 1 can increase and the area of the part in the second state S2 in the display panel can decrease accordingly: or the area of the part in the first state S1 in the display panel 1 can decrease and the area of the part in the second state S2 in the display panel can increase accordingly.

Figure 4:
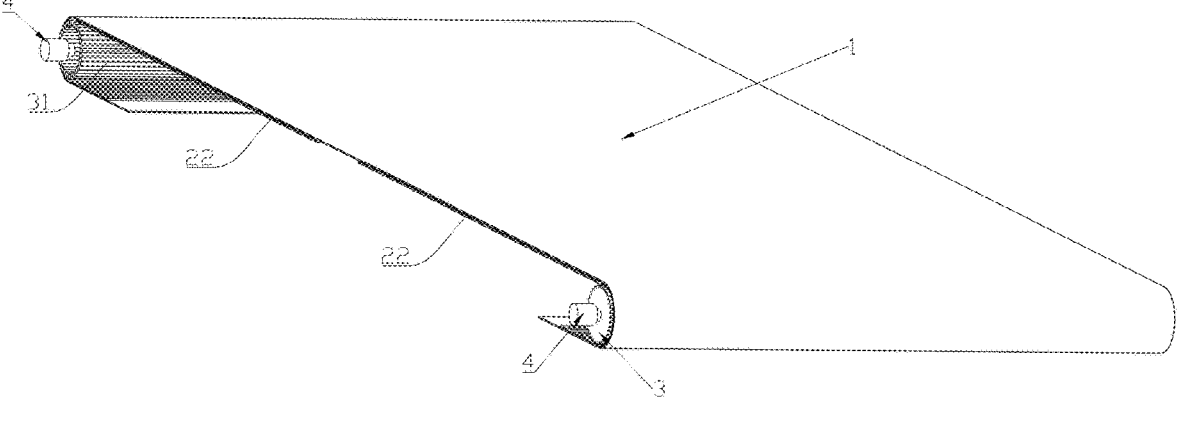
FIG. 4 shows a structural schematic view of a display module provided by another embodiment of the present application.
Figure 5:
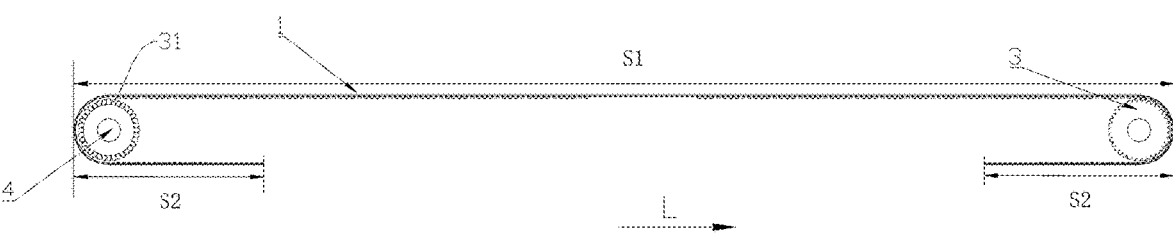
FIG. 5 shows a front view of a display module in FIG. 4.

Referring to FIG. 4 and FIG. 5, when there are two rotating shafts 3 and two sides of the support layer 2 in the first direction L are arranged around the two the rotating shafts 3 (i.e. first rotating shaft and second rotating shaft) correspondingly and respectively, the predetermined direction in which the plurality of first shape portions 22 may be arranged on the first surface 21 is the first direction L. The support layer 2 and the display panel 1 arranged around the rotating shaft 3 are divided into the part in the first state S1 and the part in the second state S2 by the rotating shaft 3. The part in the second state S2 can be located directly below the part in the first state S1. The first rotating shaft and the second rotating shaft can rotate forward or reversely in their own axes respectively, so that different second shape portions 31 on the rotating shaft 3 can engage with different first shape portions 22. The rotation directions of the first rotating shaft and the second rotating shaft are opposite to each other. During the rotation of the first rotating shaft and the second rotating shaft in opposite directions, by the engagement of the first shape portions 22 and the second shape portions 31, the area of the part in the first state S1 in the display panel 1 can increase and the area of the part in the second state S2 in the display panel can decrease: or the area of the part in the first state S1 in the display panel 1 can decrease and the area of the part in the second state S2 in the display panel can increase.

Optionally, when there are more than two rotating shafts 3 and at least one side of the support layer 2 in the first direction L is arranged around the rotating shaft 3, it is also possible that at least one side of the support layer 2 in a second direction W is arranged around the rotating shaft 3. Not only may the plurality of first shape portions 22 be arranged in the first direction L, but the plurality of first shape portions 22 may also be arranged in the second direction W. The first direction L crosses with the second direction W. Thus, the rotating shaft 3 in different directions and at different positions can be adjusted according to requirements. By the engagement of the first shape portions 22 and the second shape portions 31 at corresponding positions, when the rotating shaft 3 is rotated, the rotating shaft can drive the area of the part in the first state S1 in the display panel 1 to increase or decrease.

The arrangement of the plurality of first shape portions 22 in the predetermined direction on the first surface 21 can be determined according to the number, arrangement, and position to be adjusted of the second shape portions 31 which are arranged.

Figure 6:
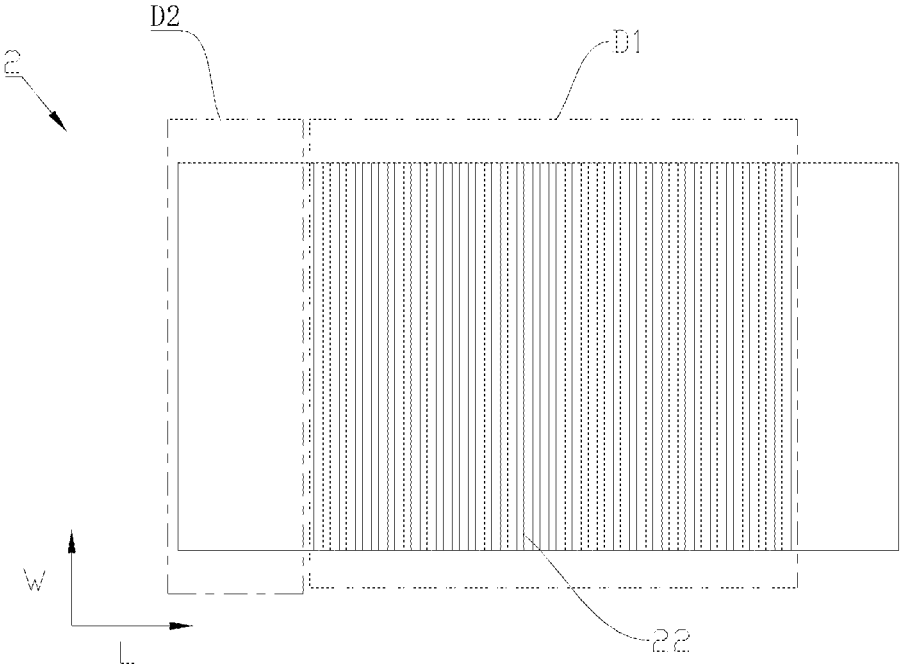
FIG. 6 shows bottom view of a support layer in an unfolding state provided by an embodiment of the present application.

Referring to FIG. 6, the first surface 21 of the support layer 2 includes an engaging region D1 and an attaching region D2, the attaching region D2 is located at at least one side of the engaging region D1 in a direction perpendicular to an axial direction of the rotating shaft 3, the first shape portion 22 is arranged in the engaging region D1, and a surface of the attaching region D2 is flat. By arranging a surface of the attaching region D2 to be flat, the support layer 2 can be attached and fixed at a corresponding position, so as to realize mounting and fixing the display panel 1 and prevent the display panel 1 from falling off easily. What needs to be emphasized here is that the engaging region D1 and the attaching region D2 divided by the first surface 21 can be adaptively adjusted according to the different engaging structures of the rotating shaft 3 and the support layer 2. It is not limited to the arrangement in which the attaching region D2 is located at at least one side of the engaging region D1 in the axial direction perpendicular to the rotating shaft 3, as long as the first surface 21 can have the flat attaching region D2 to fix and connect the display panel 1, so as to improve the strength and stability of the connection, and the engaging region D1 of the first surface 21 can be provided with the plurality of first shape portions 22 correspondingly arranged in the predetermined direction according to the rotating shaft 3 at the corresponding position, so as to adjust the area of the part in the first state S1 in the display panel 1 without causing stress concentration to affect the performance of the display panel 1.

In some optional embodiments, the support layer 2 arranged on the non-display surface 11 of the display panel 1 may be a structure with the deformation ability and a certain strength, such as a steel plate. Thus, the support force can be provided for the flexible display panel 1, so as to avoid local wrinkles of the display panel 1 easily caused when the area of the part in the first state S1 in the display panel 1 is adjusted. At the same time, the plurality of first shape portions 22 engaged with the plurality of second shape portions 31 can be arranged on the support layer 2, and a rotating force of the rotating shaft 3 can act on the support layer 2 to avoid the direct damage to the display panel 1.

Figure 7:
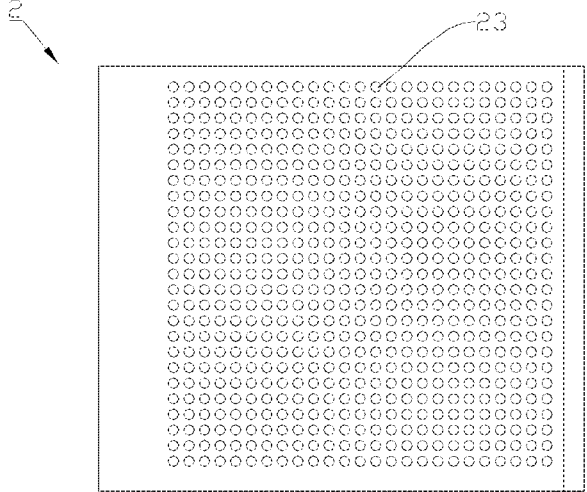
FIG. 7 shows top view of a support layer in a partially bending state provided by an embodiment of the present application.

Optionally, referring to FIG. 7, since the support layer 2 needs to be partly arranged around the rotating shaft 3, in order to ensure that the support layer 2 has better deformation ability, the support layer 2 can be provided with a plurality of first through holes 23 distributed uniformly to balance the force. When the plurality of first through holes 23 can be provided on the support layer 2 to improve the deformation ability of the support layer 2, the plurality of first through holes 23 can be uniformly arranged at least in the engaging region D1. On the basis, the plurality of first shape portions 22 can be arranged in the engaging region D1. When the first shape portions 22 are connected to the engaging region D1 having the plurality of first through holes 23, the first shape portion 22 at least partially overlaps the first through holes 23 in an orthographic projection direction of the display panel 1. In other words, orthographic projections of the first shape portions on the engaging region may be at least partially located within the first through holes. Alternatively, it is also possible that the first shape portions 22 and the support layer 2 can be integrally formed. When the first through holes 23 are arranged in the engaging region D1 uniformly, the first through holes 23 can penetrate through a part of the first shape portions 22, which is not specifically limited here.

Figure 8:
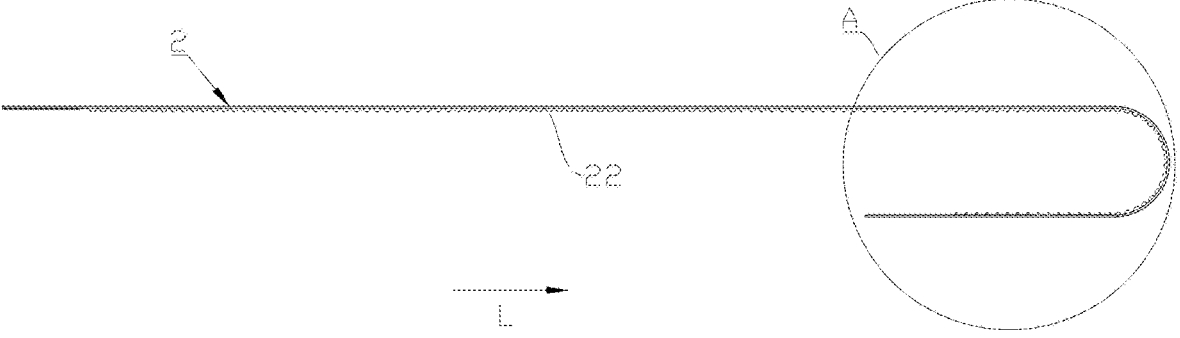
FIG. 8 shows a front view of a support layer provided by another embodiment of the present application.

Referring to FIG. 7 and FIG. 8, when the first shape portions 22 and the second shape portions 31 are gears and racks engaged with each other, a plurality of racks can be arranged in the engaging region D1 in an arrangement direction of the attaching region D2 and the engaging region D1, and a cross section of the plurality of the first shape portions is wave-shaped. Thereby, the force of meshing conversion between different gears and racks can be saved when the gear shaft rotates, so that it can be beneficial to the effect of meshing movement.

Optionally, the racks and the support layer 2 can be integrally formed to improve the strength of the connection.

In order to prevent the provided first through holes 23 from affecting the engagement between the racks and the support layer 2, the meshing between the racks and the gear shaft and the attaching and fixing strength of the attaching region D2, the plurality of first through holes 23 can be uniformly arranged in the engaging region D1, and the first through holes 23 are arranged at the positions not to interfere with the racks. For example, each of the first through holes 23 may be located in a recess formed between two adjacent racks, or each of the first through holes 23 may also be located in a position where the plurality of racks may not be arranged in the engaging region D1.

In an embodiment, the plurality of first shape portions 22 may also be directly configured as the plurality of second through holes arranged in the engaging region D1. For example, the plurality of second through hole may be arrayed and arranged in the engaging region D1, and the plurality of second shape portions 31 may be arranged as a plurality of protrusions arranged in the circumferential direction of the rotating shaft 3. In order to achieve engaging with the second through holes arranged in an array, the plurality of protrusions may be arranged in a dot matrix on the outer surface of the rotating shaft 3 in the circumferential direction, so that different protrusions can be driven to engage with the corresponding second through holes during the rotation of the rotating shaft 3, and it can realize driving the movement of the support layer 2 and the display panel 1 through engagement between the protrusions and the second through holes. At the same time, by arranging the second through holes in the support layer 2, the deformation ability of the support layer 2 itself can be improved, and the sufficient support force can be provided to support the display panel 1, thereby improving the usage stability of the display panel 1.

Hereinafter, the structure of the display module will be described in detail by taking an example that the support layer 2 can be arranged around the rotating shaft 3 at one side of the first direction L when only one rotating shaft 3 is provided.

Figure 10:
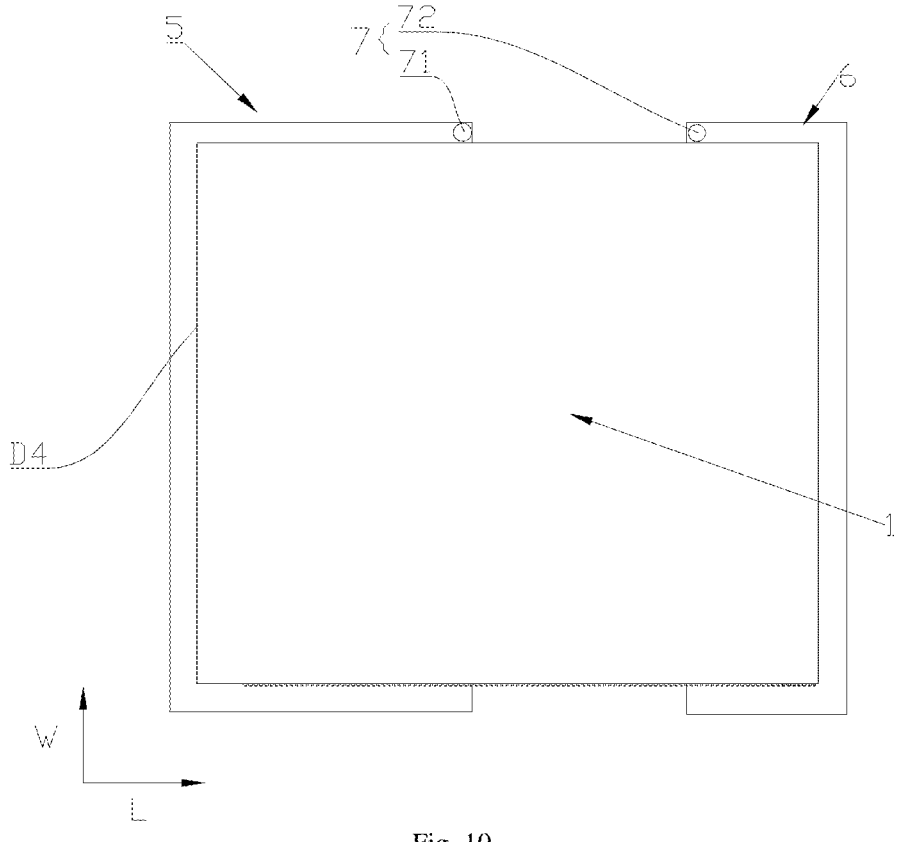
FIG. 10 shows a top view of a display module provided by an embodiment of the present application after a frame is mounted.
Figure 11:
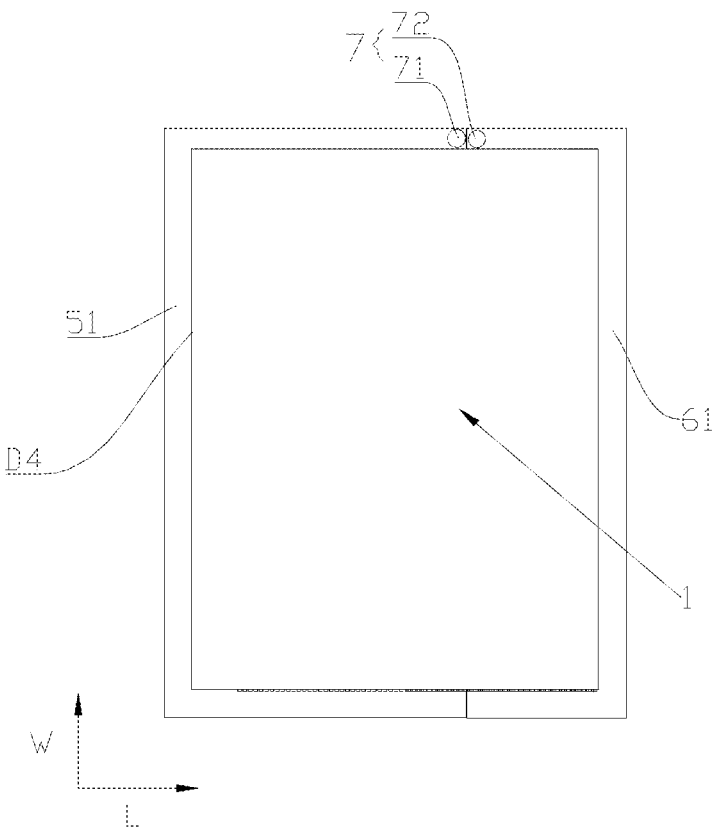
FIG. 11 shows a top view of a display module provided by another embodiment of the present application after a frame is mounted.
Figure 12:
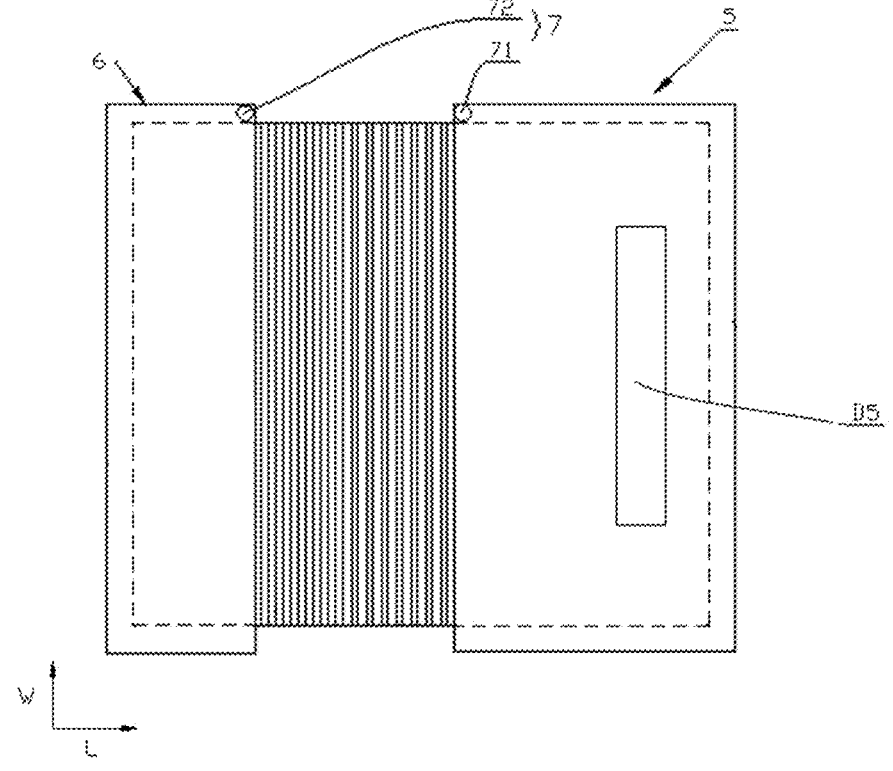
FIG. 12 shows a top view of a back of a display module provided by an embodiment of the present application after a frame is mounted.

Referring to FIG. 10 and FIG. 11, the display module further includes a first frame 5 and a second frame 6. The first frame 5 and the second frame 6 can be arranged opposite to each other. The second frame 6 and the first frame 5 at least enclosing a first window D4. Electronic components can be placed inside the first frame 5 and the second frame 6. The second frame and the first frame enabled to approach or move away from each other to change an area of the first window D4. The part in the first state S1 in the display panel 1 can be arranged in the first window D4, such that the part in the first state S1 can be a visible part. The part in the second state S2 can be always located inside the first frame 5 and the second frame 6 after being arranged around the gear shaft, so that the part in the second state S2 can be a folding part that cannot be seen.

Optionally, a position of the first frame 5and the second frame 6 corresponding to the part in the second state S2 in the display panel 1 may also be provided with a second window D5. At least the part of in the second state S2 in the display panel 1 can be partially visible through the second window D5, so that there is a part of the display panel 1 that can be visible in different directions according to requirements, so that it can improve the usage performance.

It should be noted that there are many options for how the second frame 6 and the first frame 5 can approach or move away from each other. For example, in some embodiments, a guide rail and a slider engaged with each other can be arranged in the second frame 6 and the first frame 5 respectively. When the second frame 6 is driven by an external force, the second frame 6 can be moved in the first direction L to approach or move away from the first frame 5, so that a size of an area of the first window D4 enclosed by the second frame and the first frame can be adjusted.

When the display panel 1, the support layer 2 and the rotating shaft 3 are mount in the first frame 5 and the second frame 6, the first frame 5 includes a first edge frame 51 extending parallel to the rotating shaft 3, the second frame 6 includes a second edge frame 61 extending parallel to the rotating shaft 3, and the rotating shaft 3 can be arranged at at least one of the first edge frame 51 and the second edge frame 61.

In some optional embodiments, the second frame 6 can approach or move away from the first frame 5 in the first direction L. The attaching region D2 can be located at one side of the support layer 2 in the first direction L and used for attaching and fixing to the first frame 5, and the other side of the support layer can be arranged around the rotating shaft 3. The attaching region D2 in the support layer 2 can be fixedly connected to the first frame 5, the rotating shaft 3 can be located at a position corresponding to the second edge frame 61, and the rotating shaft 3 can be rotatably connected to the second frame 6. By operating the second frame 6 to approach or move away from the first frame 5, the rotating shaft 3 can also move approach or move away from the first frame 5 in the first direction L with the second frame 6. In addition, during the movement of the rotating shaft 3 sliding and moving in the first direction L, the rotating shaft 3 can rotate, so that the second shape portions 31 on the rotating shaft can act on the first shape portions 22 in the support layer 2 engaged with the second shape portion by the rotating force, so as to realize the engagement of different first shape portions 22 and second shape portions 31: while the area of the first window D4 can be changed, the area of the part in the first state S1 in the display panel 1 can also be changed accordingly, so as to avoid local wrinkles of the display panel 1.

Figure 9:
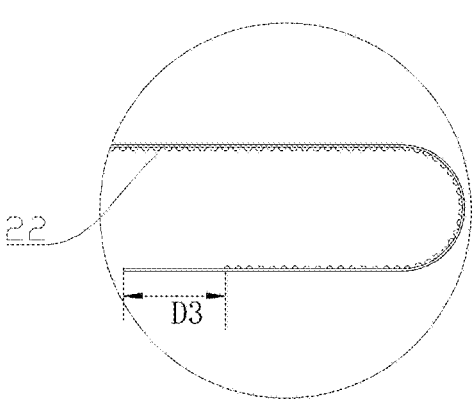
FIG. 9 shows a partially enlarged view of part A in FIG. 8.

Optionally, referring to FIG. 9, the support layer 2 further includes a guiding region D3 located on the first surface 21. The guiding region D3 has a guiding plane. The guiding region D3 and the attaching region D2 can be arranged at two sides of the engaging region D1 in the first direction L respectively. When the support layer 2 and the display panel 1 are arranged around the rotating shaft 3, the guiding region D3 and the attaching region D2 can be located at two sides of the rotating shaft 3 respectively, and the guiding region and the attaching region are parallel to each other. A limiting portion can be arranged in the second frame 6. The limiting portion has a limiting plane. The guiding region D3 of the support layer 2 at least partly extends into the limiting portion, so that the guiding plane of the guiding region D3 can be at least partially in contact with and engaged with the limiting plane. In addition, when the rotating shaft 3 rotates, the guiding plane can produce a relative movement in the limiting plane, such that two parts of the display panel 1 located at two sides of the rotating shaft 3 can be in a state of being parallel to each other. Therefore, the effect of the engagement between the first shape part 22 and the second shape part 31 can be improved when the rotating shaft 3 rotates, and local creases of the display panel 1 can be avoided.

In some other optional embodiments, the display module further includes: a distance-detecting device 7 arranged on at least one of the first frame 5 and the second frame 6 and configured to obtain a distance information between the first frame 5 and the second frame 6; a driving device 4 connected to the rotating shaft 3 and configured to drive the rotating shaft 3 to rotate; and a controller electrically connected with the distance-detecting device 7 and the driving device 4, in which the controller can control the driving device 4 to rotate according to the distance information. Whether the second frame 6 slips and moves relative to the first frame 5 can be detected by the distance-detecting device 7, and the detecting information can be fed back to the controller, so that the controller can control whether the driving device 4 works or not according to the feedback information, so as to realize controlling the rotating shaft 3 to rotate or stop rotating, and realize automatically adjusting the area of the part in the first state S1 in the display panel to increase or decrease.

Optionally, the distance-detecting device 7 includes a first detecting portion 71 and a second detecting portion 72. The first detecting portion 71 can be arranged at the first frame 5, and the second detecting portion 72 can be arranged at the second frame 6. The first detecting portion 71 and the second detecting portion 72 can be arranged opposite to each other in an axial direction perpendicular to the rotating shaft 3.

Optionally, the driving device 4 may be a motor. An output shaft of the motor can be coaxially fixedly connected to one side of the rotating shaft 3. The rotating shaft 3 can be driven to rotate around its own axis by the motor starting.

The display module includes a moving state, a suspending state, and a tension state. In the moving state, the second frame 6 and the first frame 5 can approach to or move away from each other. The rotating shaft 3 can drive the support layer 2 to rotate, such that a part of the display panel 1 is switched between the first state S1 and the second state S2. In the suspending state, a distance between the second frame 6 and the first frame 5 remains unchanged, and the rotating shaft 3 suspend rotating. When the moving state is switched to the suspending state, the distance between the second frame 6 and the first frame 5 can be maintained at the suspending state, and the rotating shaft 3 drives the support layer 2 to rotate at a predetermined angle to tension a part in the first state S1 in the display panel 1, so that the display module is in the tension state.

It can be understood that a state in which the second frame 6 is located closest to the first frame 5 (referring to FIG. 11) and the area of the first window D4 enclosed by the first frame 5 and the second frame 6 is the smallest can be defined as an initial state. In the initial state, when there is an external force that causes the second frame 6 to move away from the first frame 5 in the first direction L, a distance between the first frame 5 and the second frame 6 detected by the distance-detecting device 7 can increase and can form a first detecting signal. The first detecting signal can be fed back to the controller. After the controller receives the first detecting signal, the driving device 4 can be controlled to start to drive the rotating shaft 3 to rotate. While the rotating shaft 3 can move with the second frame 6 in a direction away from the first frame 5, the rotation of the rotating shaft 3 makes the different second shape portions 31 and the different first shape portions 22 on the support layer 2 produce the relative movements engaging with each other, so as to drive a part of the display panel 1 on the support layer 2 to slip and move. Thus, an area of the visible part in the first state S1 in the display panel can increase, and an area of an invisible part in the second state S2 can decrease. After the area of the visible part in the first state S1 increases to a required area, the external force can be removed. The distance between the second frame 6 and the first frame 5 stops changing, and both of them are in the suspending state. At this time, the distance detecting device 7 detects that the distance between the first frame 5 and the second frame 6 stops changing and forms a second detecting signal. The second detecting signal can be fed back to the controller.

After receiving the second detecting signal, firstly, the controller can control the display module in the tension state, that is, the driving device 4 can be controlled to continue to start; at this time, the rotating shaft 3 can drive the support layer 2 to rotate at the predetermined angle, so as to realize providing an unfolding force to the part in the first state S1 in the display panel 1 and making the display panel 1 flat, so that the surface of the screen can be in the tension state and there are no small creases. Then, the display module enters and remains in the suspending state. In other words, after the display panel 1 is unfolded through the tension state, the controller controls the driving device 4 to stop moving. After an acting force on the rotating shaft 3 disappears, the first shape portions 22 and the second shape portions 31 maintain an engaging state and are relatively stationary. The area of the part in the first state S1 in the display panel can be maintained at a current size (referring to FIG. 10). Similarly, when there is the external force causing the second frame 6 to move closer to the first frame 5 in the first direction L, the principle is the same as above, and will not be repeated here.

Optionally, when entering the tensioned state, the predetermined angle at which the rotating shaft 3 can drive the support layer 2 to rotate may be 1 degree to 3 degrees. The purpose is to provide the unfolding force to the display panel 1. The predetermined angle can be related to factors such as the actual flexibility of the display panel 1 itself, and is not specifically limited here.

The embodiments of the present application further provide a display device. The display device may be a mobile phone, a tablet computer, or other electronic devices with a display function. The display device includes the display module. The display module may be the display module described in any one of the above embodiments, so that the area of the unfolding part of the screen can increase or decrease as required through the display module provided.

What is claimed is:

1. A display module, comprising:
   a display panel, comprising a display surface and a non-display surface arranged opposite to each other and a part in a first state and a part in a second state;
   a support layer, arranged on the non-display surface of the display panel, the support layer having a first surface away from the display panel, and at least part of the first surface provided with at least one first shape portion arranged in a predetermined direction;
   a first frame;
   a second frame, arranged opposite to the first frame;
   a distance-detecting device comprising both a first detecting portion arranged at the first frame and a second detecting portion arranged at the second frame, wherein the distance-detecting device is configured to obtain a distance information between the first frame and the second frame;
   a rotating shaft, an outer circumference of the rotating shaft provided with at least one second shape portion, the support layer and the display panel arranged around the outer circumference of the rotating shaft, the first shape portion of the first surface engaged with the second shape portion of the rotating shaft, wherein the rotating shaft is rotatable to drive the first shape portion and the second shape portion engaged with each other to move relative to each other to drive the support layer to rotate to switch a part of the display panel between the first state and the second state
   a driving device, connected to the rotating shaft and configured to drive the rotating shaft to rotate; and a controller, electrically connected with the distance-detecting device and the driving device, and configured to control the driving device to rotate according to the distance information;

wherein when there is an external force that causes the second frame to move away from the first frame in the first direction, a distance between the first frame and the second frame detected by the distance-detecting device increases and forms a first detecting signal; the first detecting signal is fed back to the controller; after the controller receives the first detecting signal, the driving device is controlled to start to drive the rotating shaft to rotate;

when a distance between the second frame and the first frame stops changing, and both of the second frame and the first frame are in a suspending state; the distance-detecting device detects that the distance between the first frame and the second frame stops changing and forms a second detecting signal; the second detecting signal is fed back to the controller; after receiving the second detecting signal, the controller is configured to control the display module in a tension state, the rotating shaft drives the support layer to rotate at the predetermined angle, and the display module enters and remains in the suspending state.

2. The display module according to claim 1, wherein the first surface of the support layer comprises an engaging region and an attaching region, the attaching region is located at at least one side of the engaging region in a direction perpendicular to an axial direction of the rotating shaft, and the first shape portion is arranged in the engaging region, and a surface of the attaching region is flat.

3. The display module according to claim 2, wherein the support layer is provided with a plurality of first through holes distributed uniformly.

4. The display module according to claim 3, wherein the engaging region is provided with the first through holes distributed uniformly, and an orthographic projection of the first shape portion on the engaging region is at least partially located within the first through holes.

5. The display module according to claim 3, wherein the engaging region is provided with the first through holes distributed uniformly, the first shape portion is integrally formed with the support layer, and the first through holes penetrate through a part of the first shape portion.

6. The display module according to claim 2, wherein at least part of the first surface is provided with a plurality of first shape portions arranged in the predetermined direction, and the plurality of first shape portions comprise a plurality of racks arranged in an arrangement direction of the attaching region and the engaging region in the engaging region; the outer circumference of the rotating shaft is provided with a plurality of second shape portions, and the plurality of second shape portions are formed with a gear arranged in a circumferential direction of the rotating shaft and engaging with the racks.

7. The display module according to claim 6, wherein a cross section of the plurality of the first shape portions is wave-shaped.

8. The display module according to claim 2, wherein the at least one first shape portion comprises a plurality of first shape portions disposed on at least part of the first surface and arranged in the predetermined direction, the plurality of first shape portions comprise a plurality of second through holes uniformly arranged in the engaging region, the outer circumference of the rotating shaft is provided with a plurality of second shape portions, and the plurality of second shape portions are a plurality of protrusions arranged in a circumferential direction of the rotating shaft and engaged with the second through holes.

9. The display module according to claim 2, wherein the display panel comprises a rotating shaft, the rotating shaft is enabled to rotate forward or reverse in a direction of its own axis, the support layer further comprises a guiding region on the first surface, the guiding region and the attaching region are located at two sides of the engaging region respectively, and the guiding region and the attaching region are located at two sides of the rotating shaft when the support layer and the display panel are arranged around the rotating shaft.

10. The display module according to claim 2, wherein the display panel comprises two rotating shafts, each of two rotating shafts is rotatable around their own axes forwardly or reversely, rotating directions of the two rotating shafts are opposite to each other, the support layer and the display panel arranged around the two rotating shafts are divided into a part in the first state and a part in the second state by the two rotating shafts, and the part in the second state is located directly below the part in the first state.

11. The display module according to claim 1, wherein the second frame and the first frame enclose a first window, the second frame and the first frame are configured to approach or move away from each other to change an area of the first window, and a first portion of the display panel is arranged at the first window.

12. The display module according to claim 11, wherein a second window is further arranged at a position corresponding to the part in the second state in the display panel between the second frame and the first frame, and the part in the second state in the display panel is further provided with an additional visible part.

13. The display module according to claim 11, wherein a guide rail and a slider engaged with each other are arranged in the second frame and the first frame respectively.

14. The display module according to claim 11, wherein the first frame comprises a first edge frame extending parallel to the rotating shaft, the second frame comprises a second edge frame extending parallel to the rotating shaft, and the rotating shaft is arranged at at least one of the first edge frame and the second edge frame.

15. The display module according to claim 1, wherein the first detecting portion and the second detecting portion are arranged opposite to each other in an axial direction perpendicular to the rotating shaft.

16. The display module according to claim 1, wherein the display module comprises a moving state and a suspending state, in the moving state, the second frame and the first frame approach to or move away from each other, and the rotating shaft drives the support layer to rotate, such that a part of the display panel is switched between the first state and the second state;

in the suspending state, a distance between the second frame and the first frame remains unchanged, and the rotating shaft suspend rotating;

the display module further comprises a tension state, and when the moving state is switched to the suspending state, the distance between the second frame and the first frame is maintained at the suspending state, and the rotating shaft drives the support layer to rotate at a predetermined angle to tension a part in the first state in the display panel.

17. The display module according to claim 16, wherein the predetermined angle is 1 degree to 3 degrees.

18. The display module according to claim 1, wherein the support layer is made of a steel plate.

19. A display device, comprising the display module according to claim 1.

* * * * *